United States Patent
Rasper et al.

(10) Patent No.: US 6,807,886 B1
(45) Date of Patent: Oct. 26, 2004

(54) KNIFE INDEXING APPARATUS

(75) Inventors: Mark Rasper, Oshkosh, WI (US); Tim Rulseh, Neenah, WI (US)

(73) Assignee: Productive Solutions INC, Neenah, WI (US)

( * ) Notice: Subject to any disclaimer, the term of this patent is extended or adjusted under 35 U.S.C. 154(b) by 503 days.

(21) Appl. No.: 09/222,282

(22) Filed: Dec. 28, 1998

Related U.S. Application Data

(60) Provisional application No. 60/070,405, filed on Jan. 5, 1998.

(51) Int. Cl.[7] .............................. B23B 3/06; B23P 15/28
(52) U.S. Cl. .............................. 82/100; 407/90; 83/640; 83/955
(58) Field of Search .............................. 83/54, 34, 640, 83/646, 955, 508.2; 82/113, 46, 100, 101; 407/64, 78, 90, 113

(56) References Cited

U.S. PATENT DOCUMENTS

| | | | | |
|---|---|---|---|---|
| 1,782,237 A | * | 11/1930 | King .............................. 82/100 |
| 2,617,177 A | * | 11/1952 | Montgomery ................ 407/64 |
| 3,602,209 A | * | 8/1971 | Bocker ......................... 451/47 |
| 3,708,925 A | * | 1/1973 | Ainoura ........................ 451/47 |
| 4,476,753 A | * | 10/1984 | Li et al. ......................... 83/54 |
| 4,512,224 A | * | 4/1985 | Terauchi ....................... 82/100 |
| 4,577,532 A | * | 3/1986 | Cavalli .......................... 74/841 |
| 4,614,136 A | * | 9/1986 | Pertle ............................. 82/44 |
| 4,646,601 A | * | 3/1987 | Borzym ......................... 83/54 |
| 4,693,157 A | * | 9/1987 | Looser ........................ 83/431 |
| 4,748,880 A | * | 6/1988 | Languillat .................... 82/100 |
| 4,776,248 A | * | 10/1988 | Birkestrand ...................... 82/4 |
| 4,901,611 A | * | 2/1990 | Bentley ........................ 82/100 |
| 5,269,210 A | * | 12/1993 | Johnson ....................... 82/100 |
| 5,555,783 A | * | 9/1996 | Pienta ............................. 82/96 |
| 5,603,250 A | * | 2/1997 | Robinson ....................... 82/56 |
| 5,761,976 A | * | 6/1998 | Bailey ......................... 83/955 |
| 5,904,283 A | * | 5/1999 | Kanbar ........................ 225/10 |
| 5,927,175 A | * | 7/1999 | Franks et al. .............. 83/508.2 |
| 6,152,658 A | * | 11/2000 | Satran et al. ................ 407/113 |
| 6,158,927 A | * | 12/2000 | Cole et al. .................. 407/113 |
| 6,383,567 B2 | * | 5/2002 | Ager et al. ................. 427/282 |

* cited by examiner

*Primary Examiner*—Allan N. Shoap
(74) *Attorney, Agent, or Firm*—Russell L Johnson

(57) ABSTRACT

The invention is for a knife indexing apparatus for a non-rotating core cutting knife and a means for automatically indexing the knife during core cutting operations. The apparatus employs the discovery that by indexing the knife in the direction of rotation of the core, at least one additional fresh cutting edge can be presented to the work than would be the case if the knife were rotated in the direction opposite to the direction of rotation of the core to be cut.

1 Claim, 2 Drawing Sheets

KNIFE INDEXING APPARATUS

CROSS-REFERENCE TO RELATED APPLICATION

This application claims the benefits of Provisional Patent Application 60/070,405 filed Jan. 5, 1998.

BACKGROUND OF THE INVENTION

1. Field of the Invention

This invention relates to non-rotating circular knives used in cutting cores to length.

More specifically, this inventions relates to means for automatically indexing a core cutting knife to present a fresh cutting edge to the work.

2. Background of the Invention

Non-rotating circular knifes are a preferred instrument for cutting cores to length.

A common mode of cutting cores is to mount a length of core on a mandrel and position the core relative to a knife that is movable towards and away from the core. The core is then rotated and the knife advanced into the core until a core segment of the desired length is severed from the core. The knife is then retracted and the core advanced on the mandrel to a new cutting position and the cycle is repeated.

The materials and methods used in forming cores are intended to make cores as tough and durable as is practical. The result is that cores are not easy to cut. Knife wear and thermal degradation as well as some mechanical damage are present in nearly every cut. This results in a relatively short life for the cutting edge and the frequent need to provide a new cutting edge.

Present practice is for an operator to monitor the cut and when he becomes aware that the knife had degraded to a point where the degradation is adversely effecting the cut, the knife is rotated to provide a new edge. Both the knife indexing apparatus and the method of indexing the knife are simple and straightforward.

Upon determination that the knife degradation requires the provision of a fresh cutting edge, an operator stops the cutting process, loosens the knife on its mount, rotates the knife to present a new edge, tightens the knife on its mount, and restarts the cutting process.

Heretofore, it has been common practice in the art to rotate the knife on a fixed mandrel to present a new cutting edge to the work. Typically, the rotation is done by hand and by eye and without regard to the direction in which the knife is rotated relative to the direction of rotation of the work being cut. As a consequence of this imprecise and unknowing approach, the number of knife repositionings that were had before the useful perimeter of the knife was consumed was often four or less.

The indexing apparatus of this invention increases the number and quality of the cuts that can be made with a single knife while reducing knife cost and machine down time.

The indexing means of this invention enables the precise repositioning of the knife without interrupting a cutting cycle, and as a consequence makes practical the programing and automating of knife indexing so that operator intervention relating to the knife is required only to remove a consumed knife and replace it with a fresh one.

The present invention involves methods wherein the number of cuts are summed and when they reach a predetermined number, the knife is rotated to present a new edge. The core cutting operation is thereby rendered more efficient and safe. Advancements in technologies and techniques have permitted the improvement of the knife indexing apparatus to the point wherein it can be fully automatic and requires only infrequent operator attention.

It has been discovered that the pattern of knife edge degradation is not symmetrical about the radius of the knife along which the knife is advanced. This discovery has lead to the discovery that the angle through which a knife needs to be rotated to provide a new cutting edge for the cutter is greater in one direction of rotation than it is in the other direction of rotation. If the knife is rotated so that it moves with the direction of rotation of the core the angle of rotation needed to reach a fresh edge is less than the angle of rotation needed to reach a fresh edge if the knife is rotated against the direction of rotation of the core.

This invention combines discoveries of the inventor with advances in the art to provide novel and unobvious improvements in a core cutting knife indexing apparatus.

It is an object of this invention to provide a knife indexing apparatus that combines known mechanisms and means with new discoveries and art knowhow to provide a knife indexing apparatus for non-rotating circular knife core cutters that is an improvement in the state of the art.

It is further an object of this invention to provide the knife indexing apparatus as described above wherein the combinations of mechanisms and means admit to automation to the degree that operator interaction is not required during the useful life of the circular knife.

It is further an object of this invention to provide the knife indexing apparatus as described above wherein art knowledge and discoveries are incorporated with suitable mechanisms and means to provide a knife indexing apparatus that is more efficient, accurate, and reliable than prior art core cutting knife indexing apparatus.

Other objects will be made apparent by the following specifications, claims and the attached drawings.

DESCRIPTION OF RELATED ART

The prior art does not provide an apparatus for automatically indexing a non rotating core cutting knife in the direction of rotation of the core to be cut.

Most of the technologies and mechanisms used in this invention are known in the core cutting art.

Prior art practices in repositioning non-rotating core cutting knives have been to rotate the knife against the rotation of the core to be cut to avoid introducing lash or play into the knife holding assembly or the rotations have been made without regard to the direction of rotation of the core to be cut.

It has been discovered that the degradation of the edge of the knife is not symmetrical about the radius along which the knife is advanced into the core. This invention embodies that discovery in an apparatus that repositions the core cutting knife by rotating it in the direction of least degradation. This permits the rotation of the knife through a smaller angle to reach a fresh edge than would be the case if the knife were rotated in the opposite direction. Depending on the thickness of the core being cut and the material that it is made of, this procedure results in the increase of one or more knife indexing cycles before the edge of the knife is completely degraded than would be the case if the knife were rotated in the opposite direction with the same degree of precision as provided by the index of this invention.

BRIEF DESCRIPTION

The invention in one of its simplest forms is; a knife indexing apparatus comprising; a rotatable mandrel, a circular knife fixedly mounted on said mandrel, a worm gear fixedly mounted on said mandrel, a worm having a shaft and the worm is operably engaged with said worm gear, an overrunning coupling engaged with said shaft of said worm, a rotary actuator connected to the overrunning coupling and a means for actuating said coupling so as to rotate said knife through a set angle in the direction of rotation of a core to be cut.

The method of operating said knife indexing apparatus comprises the steps of; advancing a knife indexing apparatus into a core to effect a core cut, withdrawing the knife indexing apparatus, incrementing a counter, interrogating the counter, repeating the cycle until the counter indicates a preestablished condition, activating a rotary actuator which rotates the overrunning coupling to rotate the shaft of the worm a preestablished distance which causes the worm gear to rotate the mandrel which causes the knife to rotate through a preestablished angle, returning the overrunning coupling to its starting position, returning the counter to its starting position, and starting a new knife indexing cycle.

DETAILED DESCRIPTION

Figure 1:
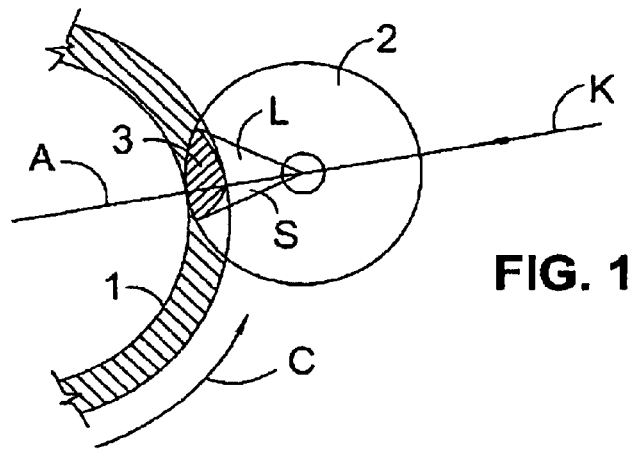
FIG. 1 is a schematic elevation view of the degradation pattern developed in a non-rotating knife as it cuts a rotating core.

In the drawings like numbers refer to like objects and the proportions of some elements have been modified to facilitate illustration.

Referring now to FIG. 1 wherein core 1 is shown to rotate in the direction of arrow C. Non-rotating knife 2 is advancing radially in the direction of arrow K to effect a core cut. As knife 2 advances into core 1 friction and heat build up and cause degradation of knife 2 in a pattern shown as cross hatched degradation area 3. When the edge of knife 2 has degraded to the degree that a new edge should be presented along radial axis A, it can be seen that knife 2 will present a new edge along axis A when rotated through an angle S in the direction of rotation of arrow C. A rotation through an angle L will be required to present a new edge when knife 2 is rotated in the direction against rotation arrow C. Angle L is appreciably greater than angle S.

The illustrations of FIG. 1 are schematic and the above descriptions of the phenomenon are incomplete, but they will serve to communicate the discovery that the degradation of knife 2 is not uniform about its radial cutting axis. They will also serve to communicate the collateral discovery that rotation of knife 2 in the direction with the rotation of core 1 will result in a smaller angle of rotation to reach a new edge than would be the case if knife 2 were rotated against the direction of rotation of core 1. As a result, more fresh cutting edges can be indexed into position when rotating knife 2 in one direction than would be the case if knife 2 were rotated in the opposite direction.

It has been found that significant savings in knife cost due to an increase in the number of quality cuts achievable per knife and significant operating cost savings due to reductions in machine down time can be achieved by employing automated apparatus to perform the various tasks now performed manually. The knife indexing apparatus of FIG. 2 is a preferred method of providing an automated knife indexing apparatus for core cutters.

Figure 2:
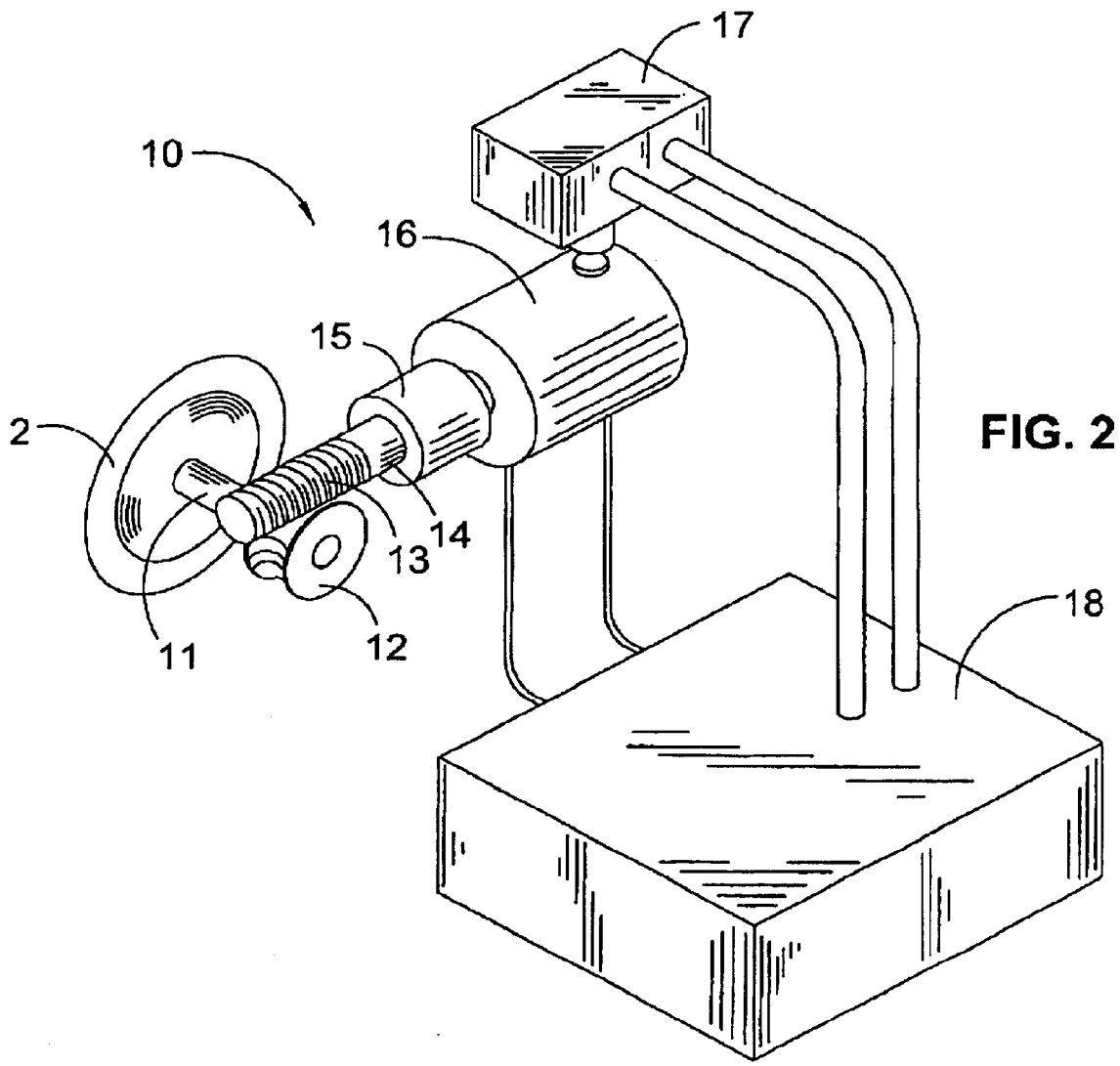
FIG. 2 is a schematic pictorial view of the knife indexing apparatus of this invention, and its relationship to an associated sensor and controller.

Referring now to FIG. 2 wherein a knife indexing apparatus 10 is illustrated schematically. Knife indexing apparatus 10 has knife 2 fixedly mounted on rotatable arbor 11. Arbor 11 has fixedly mounted thereon worm gear 12 which is operably engaged with rotatable worm 13 which has as a part thereof, worm shaft 14. Shaft 14 is joined to overrunning coupling 15. Overrunning coupling 15 has the characteristic that it will rotate worm shaft 14 when rotated in one direction and will rotate on worm shaft 14 when rotated in the opposite direction. Overrunning coupling 15 is engaged with rotary actuator 16 which serves to rotate overrunning coupling 15 through a preset angle and then counter rotate it to its starting position.

The apparatus described above is capable of indexing the knife in the interval between the end of one cut and the beginning of another cut so that the core cutting operations need not be interrupted to index the knife. The precision, efficiency, and reliability of the knife indexing is enhanced by the employment of modern electronic sensing and control means. In FIG. 2 event sensor 17 serves to detect each cutting cycle of apparatus 10. A signal is transmitted to index controller 18. Controller 18 interprets the signal from sensor 17 and when programed to do so sends an indexing command to rotary actuator 16 to index knife 2.

Modern electrical technology provides the art with controller capabilities that permits the designing of a controller such as controller 17 wherein a single module or chip can provide a controller 17 with the means for performing a multiplicity of functions. For example: the operational sequencing illustrated in the flow chart of FIG. 3 incorporates a cut counter stepping function 32 that serves as a means for counting cutting cycles and an index counter stepping function 35 that serves as a means for counting indexing cycles. Further, the flow chart of FIG. 3 incorporates a decision box 33 that will branch control to a knife indexing box 34 that serves as a means for activating the indexing of the knife when the preset number of cutting cycles has been completed and a signal box 38 that serves as a means for performing the function of terminating cutting operations when a predetermined number of indexing cycles has been completed and a predetermined number of cutting cycles has been completed.

Figure 3:
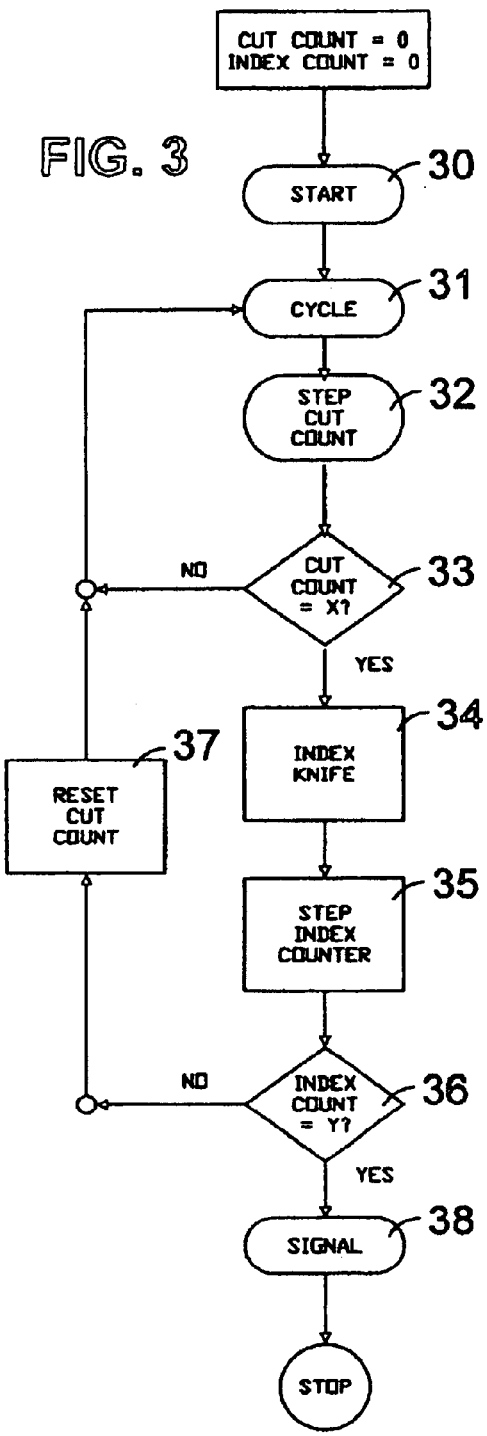
FIG. 3 is a typical logic flow chart for the steps followed by the controller.

Referring now to FIG. 3 which is a flow chart illustrating the operational sequencing of a fully automated core knife indexing apparatus that would require no operator intervention during the useful life of the knife edge.

The angle through which the knife is rotated in one repositioning or indexing cycle is in the preferred embodiment set into the indexing apparatus and remains constant for the apparatus until changed by a resetting procedure. The cut counter and the index counter are set at zero and return to that value when reset.

The operational sequence after the start 30 of the core cutting operation is to; cycle 31 the knife through a cut; step the cut counter. 32 (add one); interrogate the cut counter 33, if the cut counter has not reached the set value, take the return path to another cutting cycle 31; if the cut counter 33 has reached the set value take the knife index 34 path and index the knife; then step the index counter 35 (add one); interrogate the index counter 36; if the index counter has not reached the set value, take the path to reset the cut counter 37 to zero and return to cycle 31 to again start a cut counting sequence; if the index 36 has reached the set value, activate a signal 38 and stop cutting operations.

The above sequence permits the continuous operation of the core cutter during the useful life of the knife.

Figure 4:
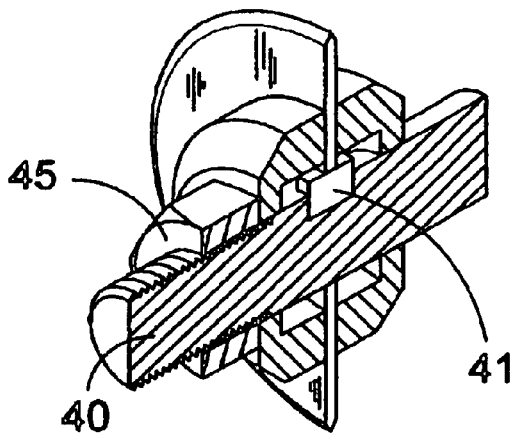
FIG. 4 is a sectioned view showing a typical means for securing a non-rotating knife to a rotatable arbor.

Referring now to FIG. 4 wherein a arbor 40 is provided with positional index 41 which is here shown as a key and keyway which is common positional index used in the art.

In FIG. 4, a conventional threaded nut 45 is shown as a common means for securing the knife on the mandrel.

The above disclosures are enabling and teach the best methods of practicing the invention known to the inventors at the time the invention was made. The apparatus of this invention comprises Mechanisms, apparatus and technologies that are known in the art separately and in different combinations. Further, equivalent mechanisms, apparatus and technologies could be substituted for those disclosed above without departing from the novel combination of elements of this invention.

Therefore, the scope of this invention should not be limited by the above disclosures but the scope of this invention should be limited only by the scope of the appended claims and all equivalents thereto that would become apparent to one skilled in the art.

What is claimed is:

1. A non-rotating circular core cutting knife and an indexing means therefor, comprising;

a) a circular knife defining a central orifice and a positional index adjacent to the central orifice, b) a knife mounting mandrel sized to pass through and closely fit the central orifice, c) a positional index engaging means (41) secured to the mandrel, d) a means for securing the knife in place on the mandrel, e) a worm gear secured to the mandrel, f) a worm shaft having as a part thereof a worm and the worm is operably engaged with the worm gear, g) an overrunning coupling operably secured to the worm shaft so that the coupling in an engaged portion of a cycle, indexes the knife in the direction of rotation of a core being cut, h) a means (17) for counting cutting cycles of the knife and a means (18) for counting indexing cycles of the indexing means, i) a means (18) for activating the knife Indexing means when a preset number of cutting cycles has been completed and a means (38) for terminating cutting operations when a predetermined number of indexing cycles has been completed and a predetermined number of cutting cycles has been completed.

\* \* \* \* \*